(12) United States Patent
Sicard (10) Patent No.: US 8,355,963 B2
(45) Date of Patent: Jan. 15, 2013

(54) METHOD FOR CONTROLLING A SUPPLY CHAIN

(75) Inventor: Paul Sicard, Longueuil (CA)

(73) Assignee: Ceritar Technologies Inc., Boucherville, QC (CA)

( * ) Notice: Subject to any disclaimer, the term of this patent is extended or adjusted under 35 U.S.C. 154(b) by 694 days.

(21) Appl. No.: 12/356,673

(22) Filed: Jan. 21, 2009

(65) Prior Publication Data

US 2010/0185482 A1    Jul. 22, 2010

(51) Int. Cl.
*G06Q 10/00*    (2012.01)
(52) U.S. Cl. .......................................................... 705/28
(58) Field of Classification Search ................. 705/7.11, 705/28
See application file for complete search history.

(56) References Cited

U.S. PATENT DOCUMENTS

| | | | |
|---|---|---|---|
| 7,249,044 B2 | 7/2007 | Kumar et al. | |
| 2002/0032612 A1* | 3/2002 | Williams et al. | 705/26 |
| 2002/0052766 A1* | 5/2002 | Dingman et al. | 705/7 |
| 2002/0143598 A1 | 10/2002 | Scheer | |
| 2004/0225624 A1* | 11/2004 | Reynolds et al. | 705/401 |
| 2004/0243690 A1* | 12/2004 | Hancock et al. | 709/219 |
| 2004/0254808 A1* | 12/2004 | Bennett et al. | 705/1 |
| 2007/0152044 A1* | 7/2007 | Hirth et al. | 235/385 |

FOREIGN PATENT DOCUMENTS

| | | |
|---|---|---|
| GB | 2447358 | 9/2008 |
| WO | WO 02 47048 A2 | 6/2002 |
| WO | WO 02 086787 A1 | 10/2002 |
| WO | WO 03 102734 A2 | 12/2003 |

OTHER PUBLICATIONS

"FedEx staff make packages fly Employees ensure swift delivery through good time management and work to make all the pieces in this complex industry fit together to meet clients' needs, writes Andrea Li [Courier services]." South China Morning Post Aug. 26, 2006, ProQuest Newsstand, ProQuest. Web. Jul. 11, 2012.*
PCT—International Search Report (ISR)—PCT/CA2010/000074 (Form PCT/ISA/210)—Jun. 10, 2010—4 pages.

* cited by examiner

*Primary Examiner* — Seye Iwarere
(74) *Attorney, Agent, or Firm* — Benoît & Côté

(57) ABSTRACT

The present document describes a method, a processor platform and a processor readable medium for controlling a supply chain for moving goods by agents according to orders. The method comprises: updating a knowledge base populated with statuses of the goods; statuses of the agents; rules for establishing expected behaviors of the goods and of the agents; and the orders. The method further comprises: determining, based on the knowledge base, instructions to be executed by the agents for moving the goods to achieve the orders wherein each elapsed time between each agent sending the status of a good or its own status to the knowledge base and the same agent receiving an instruction is smaller that the expected completion duration of the same instruction.

27 Claims, 4 Drawing Sheets

METHOD FOR CONTROLLING A SUPPLY CHAIN

CROSS-REFERENCE TO RELATED APPLICATIONS

This is the first application filed concerning the present description.

TECHNICAL FIELD

The invention relates to the field of method and systems for controlling a supply chain for carrying and moving goods and more specifically to methods and systems adapted for multi-company, multi-service and multi-modal supply chains.

BACKGROUND OF THE INVENTION

Supply chains are for carrying and moving goods from one place to several other places in the world with multimodal means by promising requesting parties (payers) to provide a specific service, knowing as precisely as possible, at any time, the status of the specific service ordered and reliably achieving the specific service. In this field, services are specified with several kinds of data including: origin and destination locations, parties, kind, quantity and conservation prescription of goods, delivery date and conditions, quality requirements, traceability requirements, etc.

In the field of carrying and moving goods, traditional systems manage services separately according to their respective transportation domain. These transportation domains could be: Container services, Truck Load (TL), Less Than Truck Load (LTL), logistic & brokerage and others means as fleet maintain labor management, geodesic and GPS tracking. Traditional systems cannot manage globally interchanging or shifting means of transportation. This involves increasing time and risk of error to consolidate traceability of goods when many transportation means are used. Moreover, traditional systems cannot optimize the utilization of common resources available to such services. Common resources could be trucks and trailers, locations in terminals, fleet, and other resources.

In the field of carrying and moving goods, traditional systems manage different steps as well as transportation domains separately beginning with submitting quotations and ending with invoicing orders. The first step consists generally in answering clients requesting information about their order in progress or submitting quotations to the clients or taking orders. This first step is generally managed by a first system specialized on the client relationship. The second step consists in regulating the traffic for achieving transportation orders. The last step consists in collecting information about an order and invoicing it according to standard practices. Each step needs new manual and independent entries with specific information and mainly into separate systems, per transport segment (container, LTL, or VL). Such multiple entries consume time, increase the risks of errors and delays invoicing.

Another characteristic of traditional systems in the field of carrying and moving goods is the asynchronous report of execution steps and the asynchronous instruction transmittal. Most of time, the reporting of deliveries is collected one or more days later when the operator returns to the office. These differences between reality and status in the database prevent the simulation of the best combination to react to an event or to promise a service to a client. The computed schedule is already wrong as soon as it is set. On the other hand, most of time, operators receive instructions on the phone without keeping a paper trail. Oral instructions cause several errors in executing the plan.

Another characteristic of traditional systems in the field of carrying and moving goods is the excessive amount of time for simulating transportation solutions. One the phone, clients cannot wait several minutes to receive a realistic quotation. In these kinds of cases, for the purpose of taking the order immediately, the quotation must be submitted immediately, within a single minute.

SUMMARY OF THE INVENTION

According to an aspect of the invention, there is presented herein a method for controlling globally and/or individually, and for optimizing based on live events, in real-time, in a single or multi company environment, simultaneously many well known business activities such as customer relationship management (CRM), pickup calls phone services, scheduling, monitoring of picking up and delivery of parcels and operations status, of transfer, of terminal, of interleaving and of deliveries, human resource management, pricing, maintenance, engine monitoring, device monitoring and invoicing, offering thus integrated solutions to each segment of the market of goods transportation in a single system.

According to an aspect of the invention, there is provided a method for controlling a supply chain for moving a plurality of goods by a plurality of agents and according to a plurality of orders. The method comprises: updating a knowledge base populated with information comprising: a status of each one of the goods; a status of each one of the agents; a plurality of rules for establishing expected behaviors of the goods and of the agents; and the orders. The method further comprises: determining, based on at least a portion of the information in the knowledge base, a plurality of instructions to be executed by the agents for moving the goods to achieve the orders at least in part, each one of the instructions having an expected completion duration; sending the instructions to the agents; receiving the instructions for execution by the agents; upon completion of one of the instructions by one of the agents or when an event affects one of the instructions executed by one of the agents, the same one of the agents sending the status of one of the goods or its own status to the knowledge base; and returning to the updating a knowledge base, wherein each elapsed time between each one of the agents sending the status of one of the goods or its own status to the knowledge base and the same one of the agents receiving one of the instructions is smaller that the expected completion duration of the same one of the instructions.

According to yet another aspect of the invention, there is provided a processor platform for controlling a supply chain for moving a plurality of goods by a plurality of agents and according to a plurality of orders. The processor platform comprises an input means for receiving information comprising a status of each one of the goods; a status of each one of the agents; a plurality of rules for establishing expected behaviors of the goods and of the agents; and the orders. The processor platform further provides a data memory means for making available data comprising a knowledge base and a code memory means for storing a program code. The program code comprises updating the knowledge base populated with the information and determining, based on at least a portion of the information in the knowledge base, a plurality of instructions to be executed by the agents for moving the goods to achieve the orders at least in part, each one of the instructions having an expected completion duration. The processor platform further comprises a processor for executing the program code and an output means for sending output information comprising the instructions to be sent to the agents for receiving the instructions for execution by the agents. The processor platform allows, upon completion of one of the instructions by one of the agents or when an event affects one of the instructions executed by one of the agents, the same one of the agents sending the status of one of the goods or its own status to the knowledge base. Each elapsed time between each one of the agents sending the status of one of the goods or its own status to the knowledge base and the same one of the agents receiving one of the instructions is smaller that the expected completion duration of the same one of the instructions.

According to another aspect of the invention, there is provided a processor readable medium having recorded thereon statements and instructions for execution by a processor platform for carrying out a method comprising: updating a knowledge base populated with information comprising: a status of each one of the goods; a status of each one of the agents; a plurality of rules for establishing expected behaviors of the goods and of the agents; and the orders; determining, based on at least a portion of the information in the knowledge base, a plurality of instructions to be executed by the agents for moving the goods to achieve the orders at least in part, each one of the instructions having an expected completion duration; sending the instructions to the agents; receiving the instructions for execution by the agents; upon completion of one of the instructions by one of the agents or when an event affects one of the instructions executed by one of the agents, the same one of the agents sending the status of one of the goods or its own status to the knowledge base; and returning to the updating a knowledge base; wherein each elapsed time between each one of the agents sending the status of one of the goods or its own status to the knowledge base and the same one of the agents receiving one of the instructions is smaller that the expected completion duration of the same one of the instructions.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
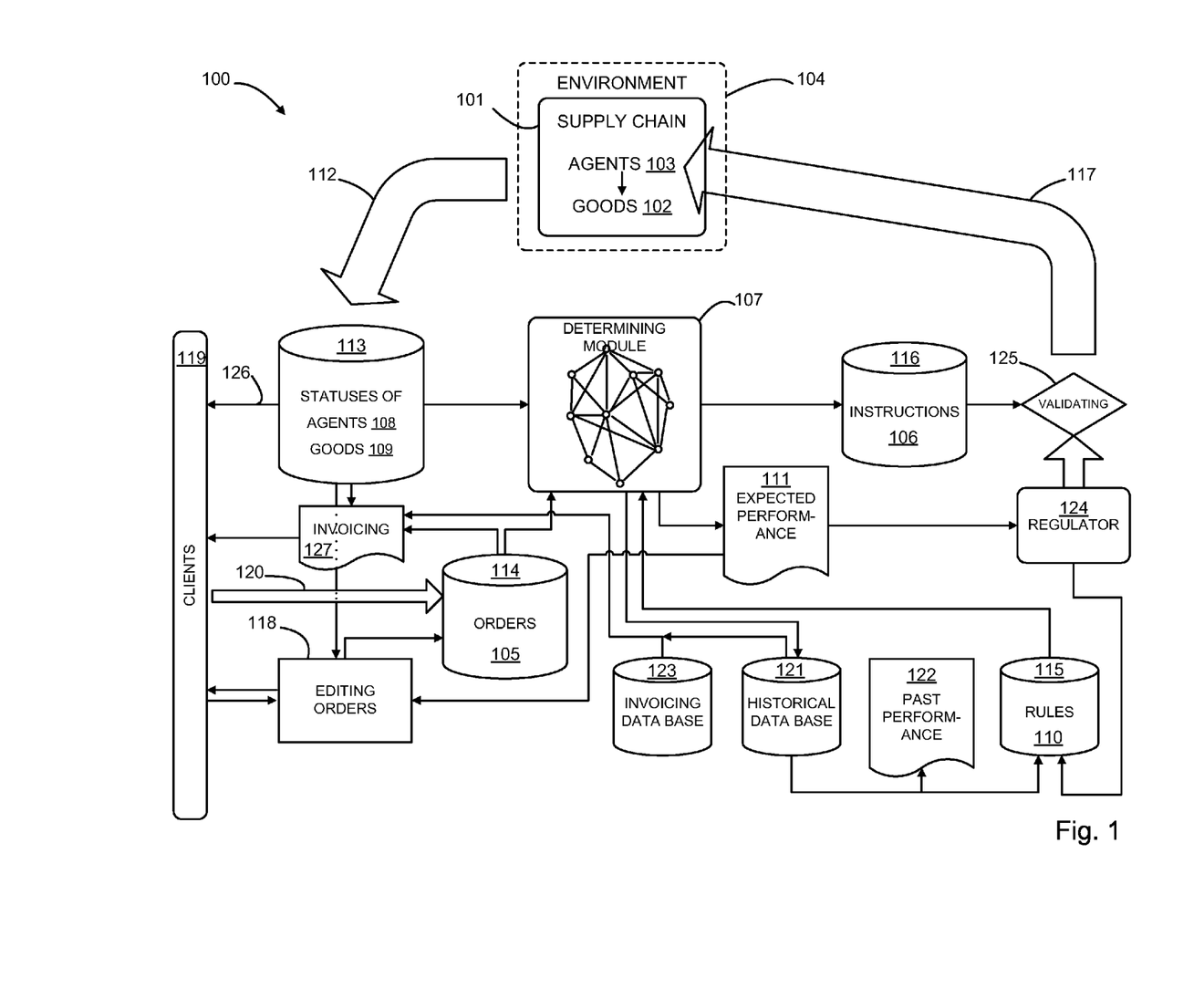
FIG. 1 is a block diagram illustrating a system using a method according to an embodiment of the invention.

Referring to FIG. 1, there is shown a block diagram of a system 100 for controlling a supply chain 101 using a method according to an embodiment of the invention. The supply chain 101 is for moving and transforming goods 102 by agents 103 into an environment 104, according to orders 105. The control of the supply chain 101 is completed by instructions 106 continuously transmitted in real-time to the agents 103, themselves controlling the goods 102. The instructions 106 are continuously determined by a determining module 107. The instructions 106 are determined for achieving at least in part the orders 105 when they are executed by the agents 103. The determining of the instructions 106 is based on a knowledge base, not numbered, continuously updated in real-time. The knowledge base comprises a synchronous status file 113 containing information about statuses of the agents 108 and statuses of the goods 109, an order file 114 containing the orders 105 and a rule file 115 containing the rules 110, establishing expected behaviors of the goods 102 and of the agent 103.

The goods 102 comprise any combination of any kind of physical entity like a unit, a package, a unit load, a container, a portion of a transport fleet, bulk material, a living animal and a person. A unit could be a single object without packaging like a car, a meat carcass, wood, a metal coil, a beam or the like. A package is generally movable by a person and contains goods packed with cardboard or other disposable or reusable packaging. A unit load combines packages or items into a single "unit" of a few thousand kilograms that can be moved easily with simple equipment. A unit load packs tightly into warehouse racks, containers, trucks, and railcars, yet can be easily broken apart at a distribution point, usually a plant, a distribution center, wholesaler, retail store, etc. A pallet is a type of unit load. A container could be a multi-purpose oversea container of different sizes, a refrigerated container, a specialized intermediate bulk container for transporting in bulk liquid, powder, aggregate or the like, and a specialized container fitted to a single unit or several units as an engine, a piece of airplane or the like. In some agreements, the goods to move or to transform comprise pieces of transport fleet like a loaded or empty trailer with or without a tractor, a wagon, an airplane, a ship and the like. Bulk material could be liquid such as chemical liquid or petroleum product, gas or solid as sand, stone, cement, coal, grains, ore, flour and the like.

The agents 103 comprise any combination of any means such as a person (e.g. a driver, a cargo handler, a maintenance man, a clerk, a manager, etc.) a moving device (e.g. a tractor, a trailer, a forklift, a crane, a ship, a wagon, an aircraft, a belt conveyor, a chain conveyor, etc.), a transforming device (e.g. a milling machine, a press, a molding tool, a cutting machine, etc.), a assembling device (e.g. a welding device, a screwdriver, a mount assembly, etc.), a packaging device (e.g. a wrapper, a bagger, a crating machine, etc.), a containing device (e.g. a pallet, a surface storage, a location in warehouse, a refrigerator, a freezing room, a container, etc.), an identifying device (e.g. a laser marking device, a device for installing RFID chip, a machine to lay labels, etc.), a monitoring device (e.g. a geographic positioning system, a physical characteristic (e.g. temperature, weight, pressure, etc.) measurement device, a presence detector, etc.), a maintenance device (e.g. a spare tire, a tow truck, a refrigeration (for maintaining the temperature), etc.), an eliminating device (e.g. a shredder, a burner, a separator, a cleaner, etc.), a communication device (e.g. a device using Bluetooth, Wi-Fi, an Ethernet network, internet, a mobility network, the novel E VDEO technology system, etc.), a power supply (e.g. electricity, fuel, hydraulic pressure source, steam source, etc.), and a financial resource (e.g. payment card, cash, etc.). According to an embodiment, the agents 103 are directly controlled by different organizations, not shown. Organizations comprise partner companies, providers, customers or public organizations resident in different countries.

The goods 102 and the agents 103 interact with themselves and within the environment 104. The environment 104 comprises any combination of any external element with which the goods 102 and the agents 103 interact such as: transport networks (land, air, and sea), traffics, meteorological phenomenon, administrative constraints (customs formalities, permits, etc.), fuel and service network, customers, providers and partners and the like.

Each one of the orders 105 comprises at least one of an expected service (i.e. what the supply chain 101 is able to achieve; e.g. shipping, logistic & brokerage, less than load shipping, vanload shipping, container transport, intermodal shipping, packaging, splitting, warehouse management, transport terminal, traceability, quality, fleet maintenance, geodesic, driving maintenance and manufacturing), an expected loading status of one of the goods (i.e. expected characteristics of one of the goods at the loading instant), an expected delivery status of the same one of the goods (i.e. expected characteristics of the same one of the goods at the delivery instant), a specification (i.e. the description of the loading environment, of the delivery environment, of the technical constraints, of the administrative constraints, a transformation map, an objective intermediate time frame) and an objective performance (i.e. a measure of at least one of a service rate, an overall equipment effectiveness, a profitability, a value added production ratio, and an assessment of an impact to the environment.). Each one of the orders 105 could further comprise contract related matters such as property, responsibility, insurance and payment. Each one of the orders 105 could come from a customer, from a partner, from one of the organizations controlling the agents 103 or from the main organization controlling the supply chain 101.

The statuses of each one of the goods 102 or of the agents 103 are formal characteristics thereof at a given instant. A status could vary at any time; it is a transcription of the real state of the goods or of the agents. A status comprises at least one of a time, a location (e.g. a geographical position), a state of association with one of the goods (e.g. "trailer ddd contains pallet ppp"), a state of association with one of the agents (e.g. "trailer ddd is pulled by tractor ttt"), a state of association with the environment (e.g. "trailer ddd is ridding on ice"), a physical characteristic (i.e. kind of goods, temperature, volume, pressure, weight, capacity, surface, level of a tank, etc.) and a logical status (e.g. "driver yyy is resting", "good kkk is controlled", "trail ggg under custom rights", "state of packaging of eeee is validated by ppp", "container hhh is insured for www dollars", "driving license of eee is valid", etc.).

Each one of the instructions 106 comprises at least a request to one of the agents for interacting with at least one of the environment, one of the goods and another one of the agents. Examples of such requests include "load the pallet xxxx at the gate gggg with the forklift ffff", "go to gate gggg and unload at location llll", "Unpack the pallet yyyy at location kkkk", "Adjust the temperature to dddd Celsius degrees", "Inflate tire tttt", "Identify the present container". Each one of the instructions 106 has expected completion duration, which is an expected duration between the expected time that one of the agents 103 will receive one of the instructions 106 and the expected time that the same one of the agents 103 will complete the same one of the instructions 106. One of the instructions 106 could be to interrupt a previous one of the instructions 106 before receiving a new one.

Each one of the instructions 106 can be assembled into, or referred to as, a set of sub-instructions to be performed by one of the agents 103. Each set of sub-instructions includes one or more sub-instructions. One of the agents 103 acts one of the instructions 106, namely one set of sub-instructions, at a time. Each one of the instructions 106 can be modified during its execution by a deletion, a modification or an addition of a sub-instruction.

The rules 110 comprise an establishment of an expected behavior of at least one of one of the goods 102 with respect to the environment 104 (e.g. "timber not to be exposed to air of less than 80% moisture"), one of the goods 102 with respect to another one of the goods 102 (e.g. "is it prohibited to move sulfuric acid and food in the same container"), one of the goods 102 with respect to one of the agents 103 (e.g. "check of a pallet of kind ffff requests an operator having a permit jjj"), one of the agents 103 with respect to the environment 104 (e.g. "trailer jjj cannot load more than ss tones on roads qqq during the winter"), one of the agents 103 with respect to another one of the agents 103 (e.g. "trailer zzz can be pulled by tractors of kind kkk"), one of the agents 103 with respect to one of the goods 102 (e.g. "trailer aaa must be cleaned before loading food"), one of the agents 103 with respect to one of the instructions 106 (e.g. "agents rrr send a receipt prior ccc minutes after receiving an instruction"). The expected behaviors are combinations of possible behaviors and of desired behaviors to achieve, as best as possible, the orders 105. The rules 110 further comprise a unitary conversion means for converting money, physical units (e.g. ISO units to imperial units and reverse) or codification; a performance calculator, a pricing calculator and an invoicing calculator.

The synchronous status file 113 is continuously updated in real-time by an updating means 112. In real time means that when a variation of the status of one of the goods 102 or one of the agents 103 appears in the supply chain 101, information of the new status is transmitted immediately to the synchronous status file 113. Sampled information may include:
  a. Data entered by operators or transferred from a local system or transmitted by sensors (ex: temperature, speed, etc.) and transmit in real time via telecommunication or mobility networks
  b. Data collected automatically from an engine computer, an IT device installed into truck or by a positioning system (GPS) or read from a barcode, Radio Frequency Identification means (RFID) or other means, and transmitted in real time via telecommunication or mobility networks.
  c. Sound recorded from operators or from any other party (e.g. voice of client, witness, etc.) or from equipment (e.g. sounds of engine, cooling machine, etc.) or from goods (e.g. crying or snoring of living goods).
  d. A picture or a movie needed for quality or traceability requirements and available in real time via telecommunication or mobility networks.

The updating means 112 transmits information via classical means such as Bluetooth, Wi-Fi, an Ethernet network, the Internet, a mobility network and the novel E VDEO technology system. Information could also transit by intermediate databases controlled by different organizations.

Hence the synchronous status file 113 is synchronized with the supply chain 101 and reflects reality as much as possible. This synchronous status file 113 could comprise:
  a. Location of loadings and deliveries, and high frequency (e.g. once a minute) historic location of equipment, goods, events, dynamic constraints, etc.
  b. Party identification, acts and agreements.
  c. Goods and equipment specifications and history of conditions during operations such as storage, moving, splitting, etc.
  d. Knowledge of hazards, failures, incidents, damages or accidents as soon as they happen.
  e. Detailed resources consumed such as age of equipment or human resources, and costs spent such as fuel or other energy, toll, living cost, insurances, etc.
  f. Any traceability information required by the contractual services sold to the clients.

g. Any quality information required by the contractual services sold to the clients as check list validated, pictures or other data.

Each of the instructions 106 is continuously transmitted in real time from an instruction file 116 to a corresponding one of the agents 103 of the supply chain 101 by a distributing means 117. The distributing means 117 could distribute an alphabetic data message, a voice message or a visual message on a computer, a display screen, a cell phone, a handle device or other receiving devices. The distributing means 117 could use communication tools such as Bluetooth, Wi-Fi, an Ethernet network, the Internet, a mobility network and the novel E VDEO technology system. The distributing means 117 could cross several networks and databases controlled by different organizations.

The determining module 107 is continuously monitoring the statuses of the agents 108 and the statuses of the goods 109. When a change appears, the determining module 107 determines the instructions 106 which will achieve, at least in part, the orders 105 when they will be executed by the agents 103. The speed of the determining module 107 combined with the speed of the distributing means 117 and the speed of the updating means 112 is such that, each elapsed time between each one of the agents sending the status of one of the goods or its own status to the knowledge base and the same one of the agents receiving one of the instructions is smaller that the expected completion duration of the same one of the instructions. The determining module 107 uses a real time and dynamic artificial intelligence system on a computer; more particularly it uses an expert system.

The expert system allows optimizing the instructions 106 according to the rules 110 which can be updated without generating a program code. The expert system comprises an inference engine, a computer program that attempts to derive answers from the knowledge base. The inference engine is the "brain" that the expert system uses to process the information in the knowledge base for the ultimate purpose of formulating new instructions. The rules 110, stored in the rule file 115 included in the knowledge base, are updated by a customizable program code allowing the input of any kind of rules without a generation of a new program code.

The determining module 107 forecasts several scenarios of instructions and determines optimized instructions using usual tools of expert systems including operational research tools. The determining module 107 takes into account overall rules 110, overall orders 105, overall statuses of agents 108 and overall statuses of goods 109, globally; e.g. a change in a pricing of a vanload provider could modify the choice of a LTL service or a tractor could be used indifferently for a container service or for a LTL service.

The system 100 further comprises a module for determining an expected performance 111. While the determining module 107 determines the instructions 106, it determines also an expected status of each one of the goods 102 and an expected status of each one of the agents 103, as they are expected to be when the instructions 106 will be achieved. The expected performance 111 is determined according to the performance calculator included in the rules 110. The expected performance 111 comprises a measure of differences between the expected statuses of the goods and the orders 105, similarities between the expected statuses of the goods and the orders 105, a service rate, an overall equipment effectiveness, a profitability including costs and prices, a value added production ratio, and an assessment of an impact to the environment.

The system 100 further comprises a module editing the orders 118. A front office operator, not shown, communicates with one of clients 119 and can enter a real new order or a temporary new order, e.g. for quotation. For a new order, the determining module 107 proposes the best pricing chosen among overall available pricing of agents by crossing every kind of packaging unit (e.g. pallet, weight, volume, length in trailer, etc.), every kind of service (e.g. Vanload, LTL, container, intermodal shipping, etc.) and every kind of partner and provider. In another embodiment of the invention, one of the clients 119 can directly enter or transfer one of the orders 105 to the orders file 114 via a private assistant 120. The system 100 is able to answer a request from one of the clients 119 in real-time (i.e. minutes or seconds in some cases) by the front office operator or directly by the private assistant 120.

The system 100 further comprises a module for validating 125, permitting, given the expected performance 111 of the supply chain 101, to return directly to the module editing the order 118 or to send the instructions 106 to the agents 103 by the distributing means 117.

When a new one of the orders 105 is entered or one of the orders 105 is edited or deleted, the expected performance 111 is updated. The front office operator, connected to one of the clients 119, analyses the expected performance 111 and can validate the instructions 106 or edit the one of the orders 105.

In one embodiment of this invention, a portion of the expected performance 111 is shown on a single screen allowing a non-specialist operator to understand quickly and to respond successfully to a request of one of the clients 119.

Using the expected performance 111, a regulator 124 evaluates if the instructions 106 when executed, will achieve a good response to the orders 105. If it is, the regulator 124 can activate the validating 125 which transmit the instructions 106 to the agents 103 via the distributing means 117. If the expected performance 111 is not evaluated as a good response to the orders 105, the regulator 124 can activate the module editing the orders 118 or editing the rules 110 before evaluating again the new expected performance 111.

The system 100 further comprises a recording module, not shown, continuously recording at least one of a portion of the statuses of the goods 109, namely the recorded status of the goods, a portion of the statuses of the agents 108, namely the recorded status of the agents, and a portion of the orders 105, namely the recorded orders, to a historical database 121. A past performance 122 of the supply chain 101 is determined, based on at least one of a portion of the information in the knowledge base, a portion of the historical database 121, and a portion of the performance calculator included in the rules 110.

The past performance 122 of the supply chain 101 comprises a measure of differences between the recorded status of the goods and the recorded order, a similarity between the recorded status of the goods and the recorded order, a service rate, an overall equipment effectiveness, a profitability including costs and prices, a value added production ratio, and an assessment of an impact to the environment.

The system 100 further comprises an accessing module, accessing to the historical base 121 for purposes of at least one of traceability, quality, and risk management.

The system 100 further comprises an invoicing module 127, invoicing according to a portion of at least one of the information in the knowledge base, the historical database 121, the pricing calculator and the invoicing calculator included in rules 110, and an invoicing database 123 detailing invoicing agreements. The invoicing database 123 comprises for each one of the clients 119 a detailed price scale and the price policy of the company including the relationship with other organizations.

The clients 102 can obtain a portion of the statuses of its goods 109 either directly via a private link 126 from the synchronous status file 113 or via the front office operator.

The system 100 further comprises an updating module, updating the rules 110 according to the historical base 121. Based on a manual analysis of the historical database 121, it is possible to edit the rules. Also, in normal operation, the expert system proposes amendments of the rules 110 to enhance performances of the supply chain 101.

For satisfying the clients 119 and for achieving the orders 105, particularly the included expected services, better for all parties, the system 100 provides features such as customer relationship management (CRM), pickup calls phone services, scheduling, monitoring of picking up and truck positioning, of transfer, of terminal, of interleaving and of deliveries, human resource management, pricing, maintenance, engine monitoring and device monitoring.

Figure 2:
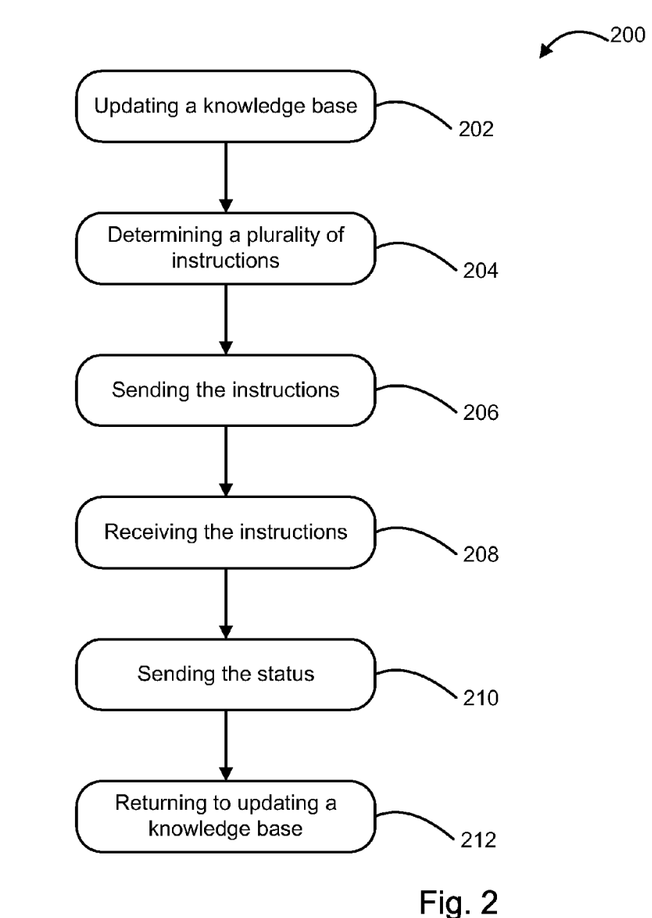
FIG. 2 is a flowchart showing a method according to another embodiment of the invention.

Referring now to FIG. 2, there is shown a flowchart of a method 200 for controlling a supply chain for moving a plurality of goods by a plurality of agents and according to a plurality of orders, according to an embodiment of the invention. Method 200 comprises: updating a knowledge base populated with information comprising: a status of each one of the goods; a status of each one of the agents; a plurality of rules for establishing expected behaviors of the goods and of the agents; and the orders (step 202). Method 200 further comprises: determining, based on at least a portion of the information in the knowledge base, a plurality of instructions to be executed by the agents for moving the goods to achieve the orders at least in part, each one of the instructions having an expected completion duration (step 204); sending the instructions to the agents (step 206); receiving the instructions for execution by the agents (step 208); upon completion of one of the instructions by one of the agents or when an event affects one of the instructions executed by one of the agents, the same one of the agents sending the status of one of the goods or its own status to the knowledge base (step 210); and returning to the updating a knowledge base, wherein each elapsed time between each one of the agents sending the status of one of the goods or its own status to the knowledge base and the same one of the agents receiving one of the instructions is smaller that the expected completion duration of the same one of the instructions (step 212).

Figure 3:
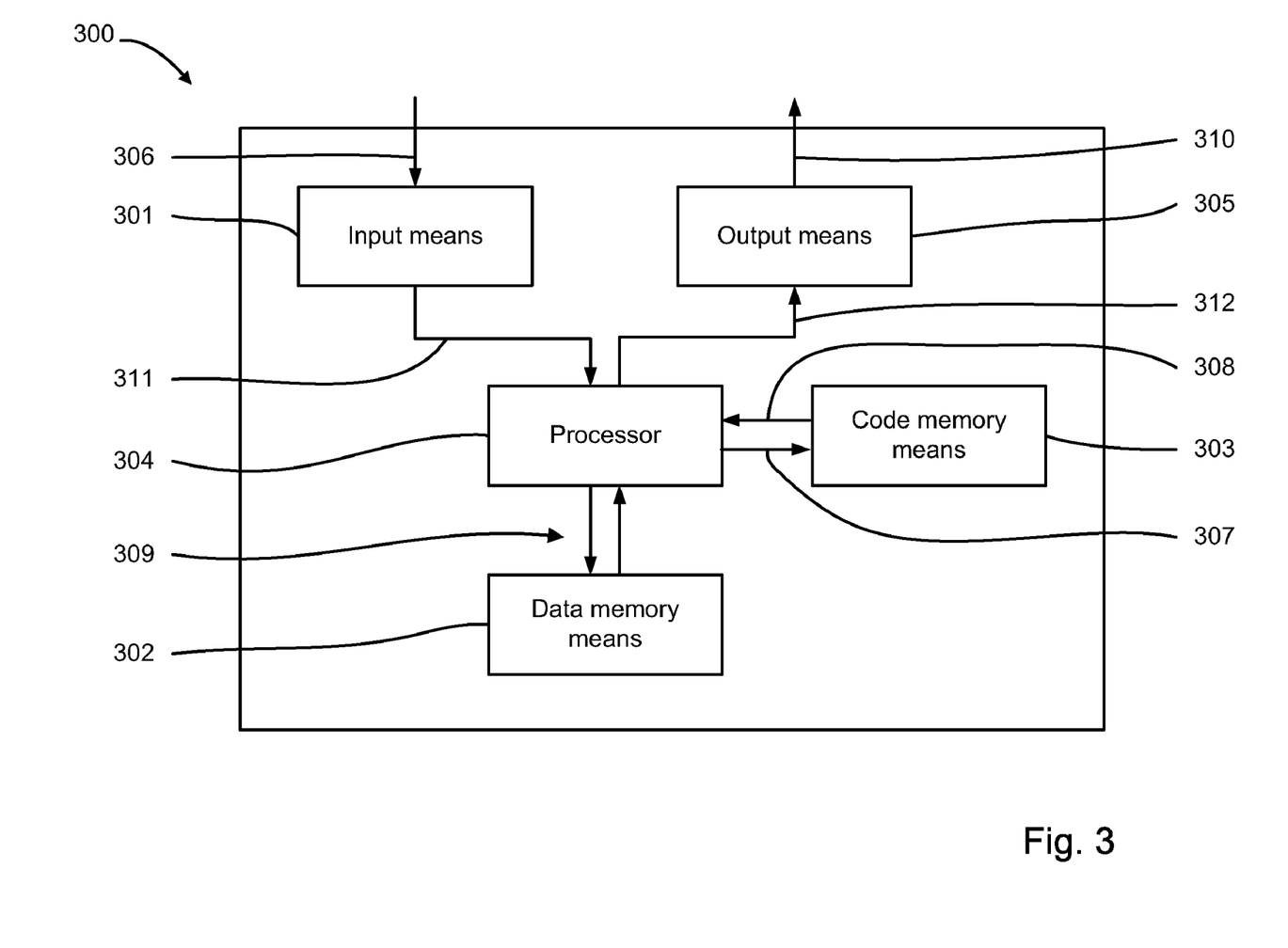
FIG. 3 is a block diagram illustrating a processor platform according to an embodiment of the invention.

Referring now to FIG. 3, there is shown a block diagram illustrating a processor platform 300 for controlling a supply chain for moving a plurality of goods by a plurality of agents and according to a plurality of orders, according to an embodiment of the invention. The processor platform comprises an input means 301, a data memory means 302, a code memory means 303, a processor 304, and an output means 305.

The input means 301 receives information 306 comprising: a status of each one of the goods, a status of each one of the agents, a plurality of rules for establishing expected behaviors of the goods and of the agents, and the orders. The information 306 further comprises requirements of controllers of the supply chain and organizations comprising partner companies, providers and clients, resident in different countries. The input means 301 receives information 306 via a plurality of communication media such as Bluetooth, Wi-Fi, an Ethernet network, the Internet, a mobility network and the novel E VDEO technology system. Information 306 could come from intermediate databases controlled by different organizations.

The data memory means 302 makes available data comprising a knowledge base populated with the information 306. Data can be stored exclusively on the processor platform 300 or divided on several remote processor platforms.

The code memory means 303 stores a program code comprising: updating the knowledge base populated with the information; and determining, based on at least a portion of the information in the knowledge base, a plurality of instructions to be executed by the agents for moving the goods to achieve the orders at least in part, each one of the instructions having an expected completion duration.

The processor 304 makes a call 307 for a portion of the program code to the code memory means 303, receives the portion of the program code 308, and executes the portion of the program code. The processor 304 exchanges, via a link 309, a portion of the data with the data memory means 302 and treats the received portion of data according to the portion of the program code 308.

The output means 305 sends output information 310 comprising the instructions to be sent to the agents for receiving the instructions for execution by the agents. The output information 310 further comprises reports (e.g. expected performance, past performance, invoicing, etc.) to controllers of the supply chain and to organizations comprising partner companies, providers and clients, resident in different countries. The output means 305 sends the output information 310 via a plurality of communication media such as Bluetooth, Wi-Fi, an Ethernet network, the Internet, a mobility network and the novel E VDEO technology system. Output information 310 can be sent to intermediate databases controlled by different organizations.

The processor 304 further controls an input 311 coming form the input means 301 and an output 312 going to the output means 305 according to the program code.

In use, the processor platform 300 allows, upon completion of one of the instructions by one of the agents or when an event affects one of the instructions executed by one of the agents, the same one of the agents to send the status of one of the goods or its own status to the knowledge base included in the processor platform 300. Each elapsed time between each one of the agents sending the status of one of the goods or its own status to the knowledge base and the same one of the agents receiving one of the instructions is smaller that the expected completion duration of the same one of the instructions.

The program code of the processor platform 300 comprises a real time and dynamic artificial intelligence system; more particularly it comprises an expert system.

The expert system allows optimizing the instructions according to the rules which can be updated without generating a new program code. The expert system comprises an inference engine, a computer program that attempts to derive answers from the knowledge base. The inference engine is the "brain" that the expert system uses to process the information in the knowledge base for the ultimate purpose of formulating new instructions. The rules, included in the knowledge base, are updated by a customizable program code allowing the input of any kind of rules without a generation of a new program code.

A person skilled in the art will understand that, according to other embodiments, the processor platform may comprise a plurality of input means, a plurality of output means, a plurality of processors, a plurality of code memory means and a plurality of data memory means, each of these components being connected locally or remotely, sharing the tasks described above.

Figure 4:
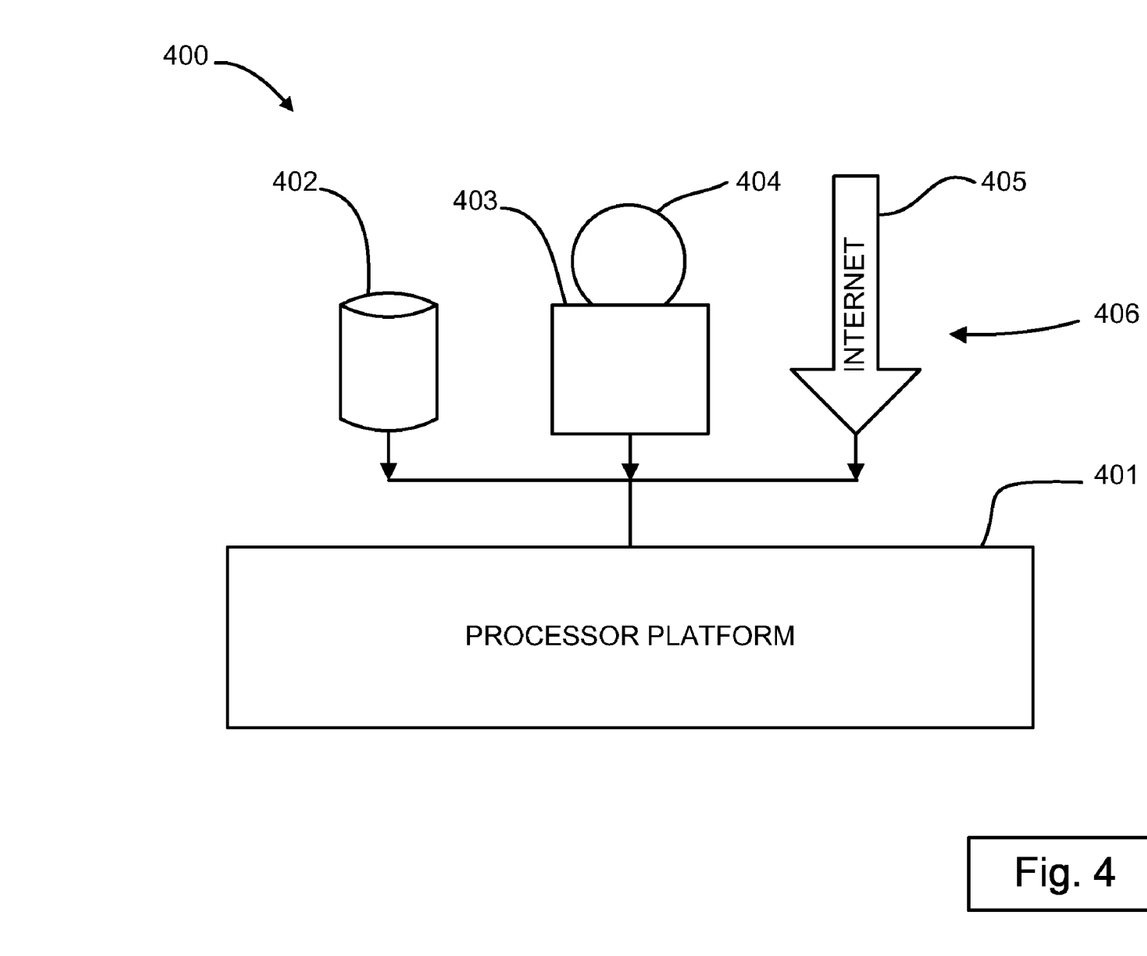
FIG. 4 is block diagram illustrating a processor platform connected to a processor readable medium, according an embodiment of the invention.

Now turning to FIG. 4, there is shown a processor platform 401 connected to a processor readable medium 406 having recorded thereon statements and instructions for execution by the processor platform 401 for carrying out the method for controlling a supply chain described herein. The processor readable medium 406 comprises a local repository 402 (e.g. a hard disk), a medium reader 403 able to read a removable medium 404 (e.g. a DVD, a Blue Ray, a USB Key, etc.) and a remote repository 405 (e.g. Internet, Ethernet, etc.).

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A method for controlling a supply chain for moving a plurality of goods by a plurality of agents and according to a plurality of orders, the method comprising:
   updating a knowledge base populated with information comprising:
      a status of each one of the goods;
      a status of each one of the agents;
      a plurality of rules for establishing expected behaviors of the goods and of the agents; and
      the orders;
   determining, by a processor, based on at least a portion of the information in the knowledge base, a plurality of instructions to be executed by the agents for moving the goods to achieve the orders at least in part, each one of the instructions having an expected completion duration;
   sending the instructions to the agents;
   receiving the instructions for execution by the agents;
   upon completion of one of the instructions by one of the agents or when an event affects one of the instructions executed by one of the agents, the same one of the agents sending the status of one of the goods or its own status to the knowledge base; and
   returning to the updating a knowledge base;
wherein each elapsed time between each one of the agents sending the status of one of the goods or its own status to the knowledge base and the same one of the agents receiving one of the instructions is smaller than the expected completion duration of the same one of the instructions.

2. The method of claim 1, wherein the determining a plurality of instructions comprises using an artificial intelligence system on a computer.

3. The method of claim 2, wherein the using an artificial intelligence system comprises using an expert system for optimizing the instructions according to the rules which are updated without generation of a program code.

4. The method of claim 1, wherein each one of the goods comprises at least one of a unit, a package, a unit load, a container, a piece of transport fleet, bulk material, a living animal and a person.

5. The method of claim 1, wherein each one of the orders comprises at least one of an expected service, an expected loading status of one of the goods, an expected delivery status of the same one of the goods, an objective time frame, a specification, a transformation map and an objective performance.

6. The method of claim 1, wherein each one of the agents comprises at least one of a person, a moving device, a transforming device, a assembling device, a packaging device, a containing device, an identifying device, a monitoring device, a maintenance device, an eliminating device, a power supply and a financial resource.

7. The method of claim 1, wherein each one of the rules comprises an establishment of an expected behavior of at least one of one of the goods with respect to the environment, one of the goods with respect to another one of the goods, one of the goods with respect to one of the agents, one of the agents with respect to the environment, one of the agents with respect to another one of the agents, one of the agents with respect to one of the goods, one of the agents with respect to one of the instructions.

8. The method of claim 1, wherein each one of the instructions comprises a request to one of the agents for interacting with at least one of the environment, one of the goods and another one of the agents.

9. The method of claim 1, wherein the status of each one of the goods and the status of each one of the agents each comprises at least one of a time, a location, a state of association with one of the goods, a state of association with one of the agents, a state of association with the environment, a physical characteristic and a logical status.

10. The method of claim 1 further comprising providing a feature comprising at least one of customer relationship management (CRM), pickup calls phone services, scheduling, monitoring of picking up, of transfer, of terminal, of interleaving and of deliveries, human resource management, pricing, maintenance, engine monitoring and device monitoring.

11. The method of claim 1, wherein the supply chain is able to achieve a service comprising at least one of a shipping, logistic & brokerage, less than load shipping, vanload shipping, container transport, intermodal shipping, packaging, splitting, terminal management, transport terminal service, traceability service, quality service, fleet maintenance, geodesic, driving maintenance and manufacturing.

12. The method of claim 1, wherein the supply chain further comprises a plurality of organizations and wherein each one of at least two of the agents are controlled by a different one of the organizations.

13. The method of claim 12, wherein the updating a knowledge base comprises collecting a portion of at least the status of one of the goods, the status of one of the agents, the rules and the orders, from a database controlled by one of the organizations.

14. The method of claim 13, wherein the sending the instructions to the agents comprises sending a portion of the instructions to one of the organizations for transmitting to one of the agents.

15. The method of claim 1, wherein the rules further comprises at least one of a unitary conversion means, a performance calculator, a pricing calculator and an invoicing calculator.

16. The method of claim 15, further comprising determining, based on at least one of a portion of the information in the knowledge base, a portion of expected statuses of the goods given the instructions, a portion of expected statuses of the agents given the instructions, and a portion of the performance calculator, an expected performance of the supply chain.

17. The method of claim 16, wherein the steps of the method are performed sequentially.

18. The method of claim 17, further comprising editing the orders before updating a knowledge base and validating the instructions before sending the instructions to the agents, the validating the instructions permitting, given the expected performance of the supply chain, to return directly to editing the order or to go to the sending the instructions to the agents.

19. The method of claim 16, wherein the expected performance of the supply chain comprises a measure of at least one of a difference between the expected status of the goods and one of the orders, a similarity between the expected status of the goods and one of the orders, a service rate, an overall equipment effectiveness, a profitability, a value added production ratio, and an assessment of an impact to the environment.

20. The method of claim 15, further comprising recording at least one of a portion of the statuses of the goods, a portion of the statuses of the agents, and a portion of the orders to a historical database.

21. The method of claim 20, further comprising determining, based on at least one of a portion of the information in the knowledge base, a portion of the historical database, and a portion of the performance calculator, a past performance of the supply chain.

22. The method of claim 21, wherein the past performance of the supply chain comprises a measure of at least one of a difference between the recorded status of the goods and the recorded order, a similarity between the recorded status of the goods and the recorded order, a service rate, an overall equipment effectiveness, a profitability, a value added production ratio, and an assessment of an impact to the environment.

23. The method of claim 20, further comprising accessing to the historical base for purposes of at least one of traceability, quality, and risk management.

24. The method of claim 20, further comprising invoicing according to a portion of at least one of the information in the knowledge base, the historical database, the pricing calculator, the invoicing calculator, and an invoicing base detailing invoicing agreements.

25. The method of claim 20, further comprising updating the rules according to the historical base.

26. A processor platform for controlling a supply chain for moving a plurality of goods by a plurality of agents and according to a plurality of orders, the processor platform comprising:
  an input for receiving information comprising:
    a status of each one of the goods;
    a status of each one of the agents;
    a plurality of rules for establishing expected behaviors of the goods and of the agents; and
    the orders;
  a data memory for making available data comprising a knowledge base;
  a code memory for storing a program code comprising:
    updating the knowledge base populated with the information; and
    determining, based on at least a portion of the information in the knowledge base, a plurality of instructions to be executed by the agents for moving the goods to achieve the orders at least in part, each one of the instructions having an expected completion duration;
  a processor for executing the program code; and
  an output for sending output information comprising the instructions to be sent to the agents for receiving the instructions for execution by the agents;
whereby
  upon completion of one of the instructions by one of the agents or when an event affects one of the instructions executed by one of the agents, the same one of the agents sending the status of one of the goods or its own status to the knowledge base; and
  each elapsed time between each one of the agents sending the status of one of the goods or its own status to the knowledge base and the same one of the agents receiving one of the instructions is smaller than the expected completion duration of the same one of the instructions.

27. A processor readable storage medium having recorded thereon statements and instructions for execution by a processor platform for carrying out a method comprising:
  updating a knowledge base populated with information comprising:
    a status of each one of the goods;
    a status of each one of the agents;
    a plurality of rules for establishing expected behaviors of the goods and of the agents; and
    the orders;
  determining, based on at least a portion of the information in the knowledge base, a plurality of instructions to be executed by the agents for moving the goods to achieve the orders at least in part, each one of the instructions having an expected completion duration;
  sending the instructions to the agents;
  receiving the instructions for execution by the agents;
  upon completion of one of the instructions by one of the agents or when an event affects one of the instructions executed by one of the agents, the same one of the agents sending the status of one of the goods or its own status to the knowledge base; and
  returning to the updating a knowledge base;
  wherein each elapsed time between each one of the agents sending the status of one of the goods or its own status to the knowledge base and the same one of the agents receiving one of the instructions is smaller than the expected completion duration of the same one of the instructions.

* * * * *